(12) United States Patent
Fuss et al.

(10) Patent No.: US 6,213,655 B1
(45) Date of Patent: Apr. 10, 2001

(54) CAMERA WITH WINDING SPINDLE EXPANDABLE TO ROTATIONALLY DRIVE FILM SPOOL

(75) Inventors: Timothy J. Fuss, Rochester; Dennis R. Zander, Penfield, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/504,700

(22) Filed: Feb. 16, 2000

(51) Int. Cl.[7] .............................. G03B 1/00; G03B 17/02
(52) U.S. Cl. ............................................ 396/411; 396/538
(58) Field of Search .................................. 396/387, 411, 396/413, 538; 242/340, 342

(56) References Cited

U.S. PATENT DOCUMENTS

| 1,144,934 | 6/1915 | Cutler ........................ 356/416 |
| 1,169,882 | 2/1916 | Speidel ....................... 242/350 |
| 1,266,319 | 5/1918 | Riddell ....................... 242/350 |
| 1,957,426 | 5/1934 | Bouveng ...................... 242/350 |
| 3,512,734 | 5/1970 | Priest ......................... 242/342 |
| 3,595,496 | 7/1971 | Nidecker ..................... 242/530.2 |
| 5,630,189 | 5/1997 | Siekierski et al. ............ 396/440 |
| 5,812,890 | * 9/1998 | Konishi et al. ............... 396/538 |
| 5,940,643 | 8/1999 | Fuss ............................. 356/415 |
| 5,950,033 | * 9/1999 | Wakabayashi ................ 396/538 |
| 5,991,533 | * 11/1999 | Tanii et al. .................. 396/396 |
| 6,101,340 | * 8/2000 | Kojima et al. ............... 396/538 |

* cited by examiner

Primary Examiner—David M. Gray
(74) Attorney, Agent, or Firm—Roger A. Fields

(57) ABSTRACT

A camera includes a cartridge receiving chamber for receiving a film cartridge having a rotatable film spool with an accessible end cavity, and a winding spindle for rotationally engaging the film spool inside its end cavity to wind exposed film into the film cartridge. The winding spindle has a concentric outer collar that is elastically expandable inside the end cavity to effect frictional torque contact with the film spool, and a concentric inner spool core that is rotatable within a center hole in the outer collar to force the outer collar to expand into frictional torque contact with the film spool. A slight reverse rotation of the inner spool core relative to the outer collar allows the outer collar to resiliently retract out of frictional torque contact with the film spool. Then, the winding spindle can be removed from the end cavity to permit the film cartridge to be removed from the cartridge receiving chamber.

10 Claims, 16 Drawing Sheets

CAMERA WITH WINDING SPINDLE EXPANDABLE TO ROTATIONALLY DRIVE FILM SPOOL

FIELD OF THE INVENTION

The invention relates generally to the field of photography, and in particular to cameras. More specifically, the invention relates to a camera in which a winding spindle is expandable into frictional torque contact with a film spool in order to rotationally drive the film spool to wind film onto the spool.

BACKGROUND OF THE INVENTION

It is well known for a camera to include a cartridge receiving chamber for receiving a film cartridge having a rotatable film spool with an accessible end cavity, and a winding spindle for rotationally engaging the film spool inside the end cavity to wind exposed film into the film cartridge. Typically, the winding spindle has a free end that is forked to rotationally engage a split rib or tine in the end cavity. The spit rib is spaced some distance from the opening to the end cavity. Thus, the forked end must be received in the end cavity far enough to reach the split rib in order to rotationally engage the split end.

When the film cartridge is inserted in the cartridge receiving chamber, initially it must be tilted to allow the forked end to enter the end cavity. The forked end must be received in the end cavity far enough to reach the split rib in order to rotationally engage the split rib. Alternatively, the winding spindle can be substantially removed from the cartridge receiving chamber, in which case the film cartridge does not have to be tilted when it is initially inserted in the chamber. The winding spindle then must be moved back into to the cartridge chamber far enough for the forked end to re-engage the split rib in the end cavity.

PRIOR ART PROBLEMS

Rotational engagement of the forked end of the winding spindle with the split rib in the end cavity of the film spool requires that the forked end and the split rib be precisely aligned.

Also, since the forked end must rotationally engage the split rib, the forked end must be moved a considerable distance when it is substantially removed from the cartridge receiving chamber to allow the film cartridge to be inserted in the chamber without tilting the cartridge. This typically requires a significant increase in the height of the camera.

SUMMARY OF THE INVENTION

If the winding spindle is designed to make rotational driving contact with the film spool without having to engage the split rib in the end cavity of the film spool, two improvements are achieved.

First, the winding spindle and the split rib need not be aligned.

Second, the winding spindle does not have to be moved into the end cavity far enough to reach the split rib. It can be moved into the end cavity a considerably less distance. Thus, a significant increase in the height of the camera is not required to substantially remove the winding spindle from the cartridge receiving chamber.

According to the invention, the winding spindle makes rotational driving contact with the film spool simply by expanding inside the end cavity of the film spool into frictional torque contact with the film spool, instead having to engage the split rib in the end cavity.

Also, the winding spindle is retractable inside the end cavity out of frictional torque contact with the film spool to permit easy removal of the winding spindle from the end cavity.

DETAILED DESCRIPTION OF THE INVENTION

Figure 1:
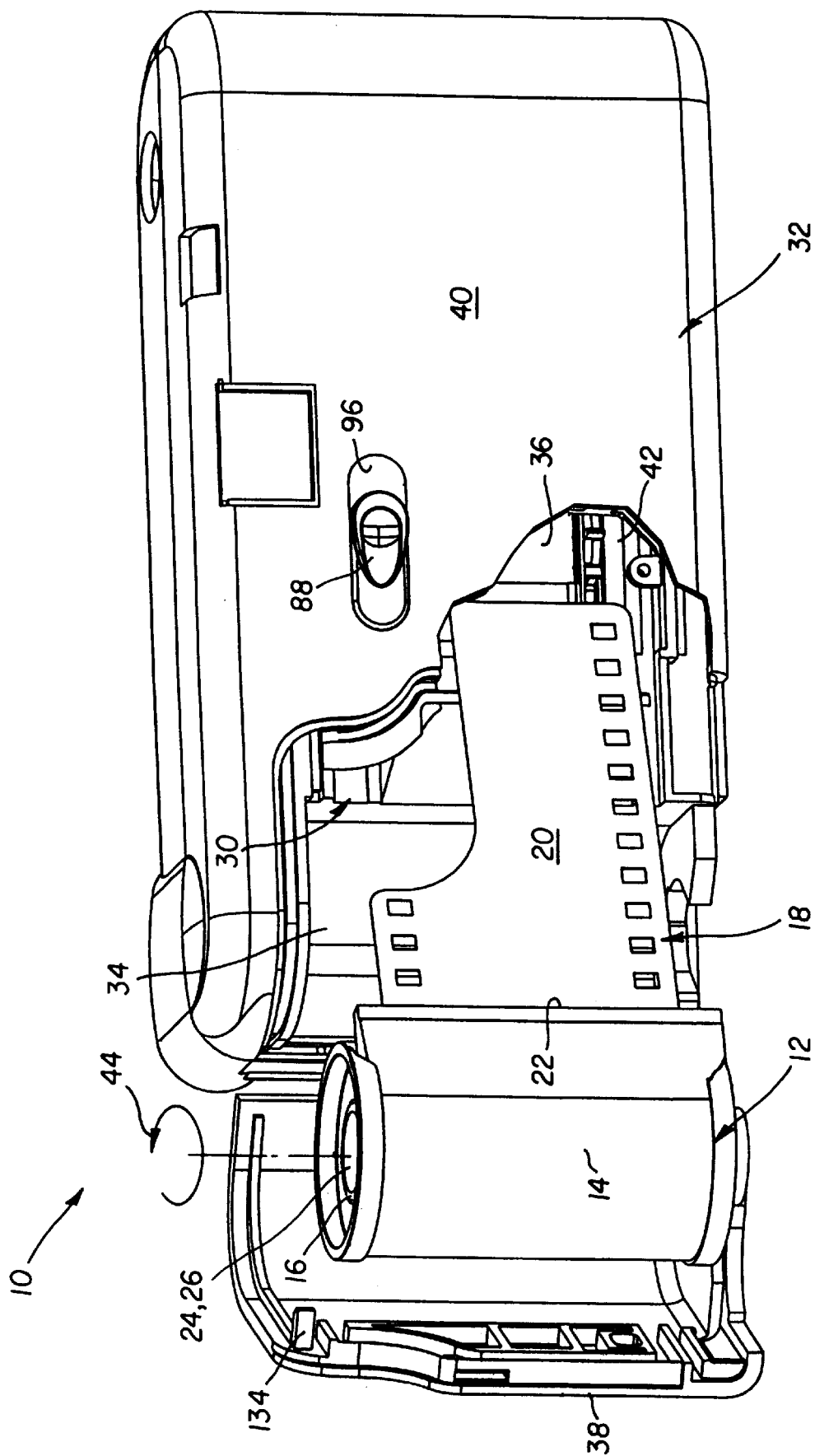
FIG. 1 is a rear perspective view of a camera with a winding spindle in the form of a preferred embodiment of the invention, showing a rear door of the camera opened to load a film cartridge into a cartridge receiving chamber in the camera or to remove the cartridge from the chamber.

The invention is disclosed as being embodied preferably in a motorized camera. Because the features of a motorized camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–16 show a motorized camera 10 that is similar in many respects to the ones disclosed in prior art commonly assigned U.S. Pat. Nos. 5,940,643 issued Aug. 17, 1999 and No. 5,630,189 issued May 13, 1997, each of which is incorporated in this application. The motorized camera 10 is a so-called "easy-load" camera which is intended to be used with a conventional 35 mm film cartridge 12.

Figure 4:
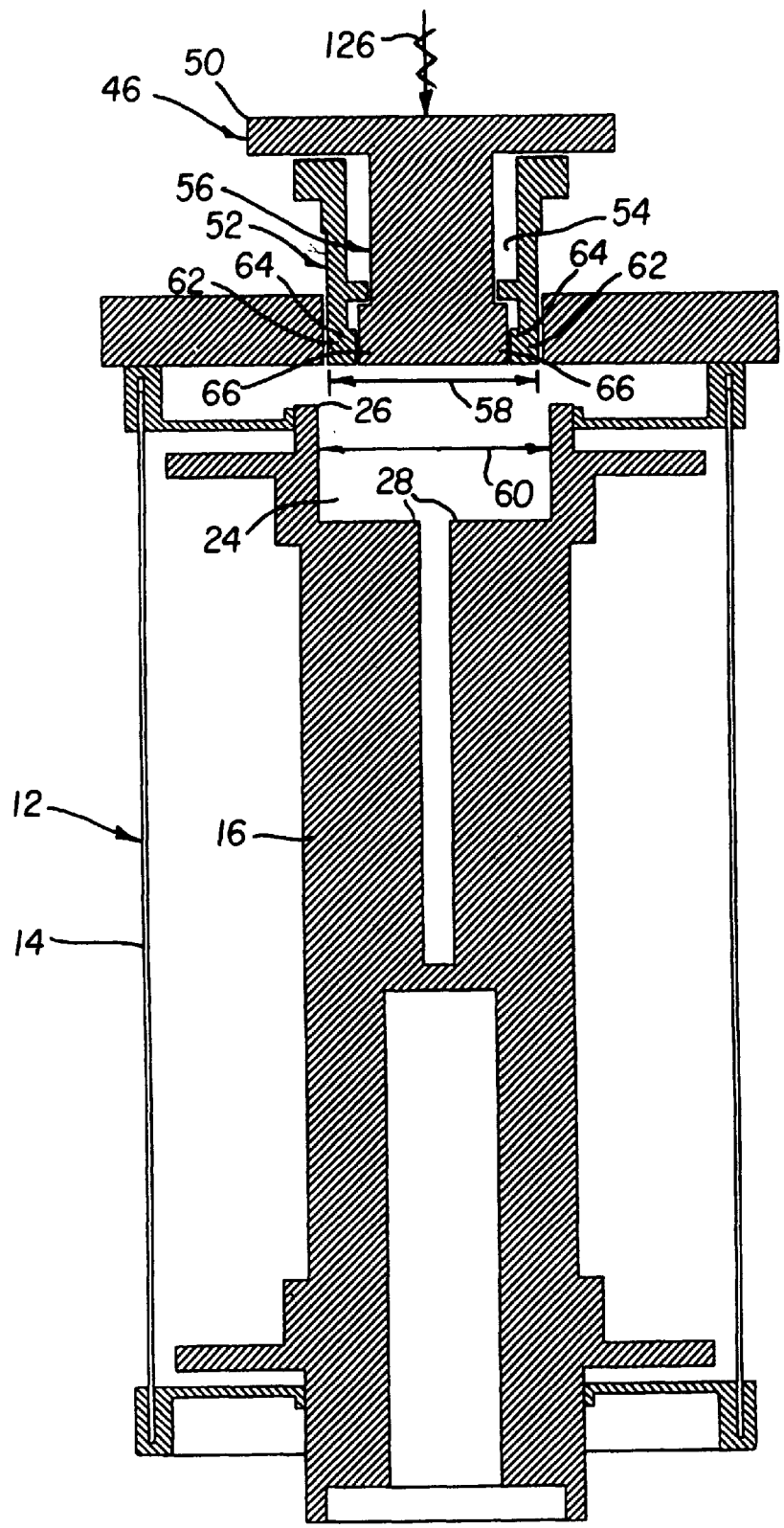
FIG. 4 is a sectional elevation view of the winding spindle, shown when the winding spindle is removed from an end cavity in a film spool in the film cartridge.

As shown in FIGS. 1 and 4, the conventional 35 mm film cartridge 12 includes a cartridge shell 14, a flanged film spool 16 rotatable within the cartridge shell, and an edge-perforated filmstrip 18 mainly coiled about the film spool and having a short film leader 20 that originally protrudes from a light-trapping slot 22 in the cartridge shell. The film spool 16 has an end cavity 24 with an ingress opening 26 that is exposed to be accessible from outside the cartridge shell 14, and it has an integral split rib or flat tine 28 that projects into the end cavity some distance from (below) the opening to the end cavity. See FIG. 4.

The camera 10 includes an interior main body part or frame 30 and an exterior housing 32. The main body part 30 has a rearwardly open cartridge receiving chamber 34 for the film cartridge 12, a rearwardly open exposed film take-up chamber (not shown), and a rearwardly open backframe (exposure) opening 36 at which successive frames of the filmstrip 18 are exposed. The backframe opening 36 is between the cartridge receiving chamber 34 and the exposed film take-up chamber. The housing 32 has a pivotal rear door 38 for the cartridge receiving chamber 34 which is opened to permit the film cartridge 12 to be placed in and removed from the chamber and is closed to seal the chamber, and it has a fixed back 40 (shown partially cut away for illustration purposes) that covers the backframe opening 36 and the exposed film take-up chamber.

To load the film cartridge 12 in the camera 10, the rear door 38 is pivoted open and substantially the entire protruding film leader 20 is inserted through a light-trapping film insertion slot (not shown) between the fixed back 40 and the cartridge receiving chamber 34 and onto a pair of parallel film rails 42 (only one shown) that longitudinally extend alongside the backframe opening 36. Then, the film cartridge 12 is placed in the cartridge receiving chamber 34, and the rear door 38 is pivoted closed. This loading procedure is further described in prior art commonly assigned U.S. Pat. Nos. 5,940,643 issued Aug. 17, 1999 and No. 5,630,189 issued May 13, 1997, each of which is incorporated in this application.

After each picture is taken with the camera 10, the exposed frame is automatically advanced from the backframe opening 36 to the exposed film take-up chamber and a fresh unexposed frame is automatically advanced from the film cartridge 12 in the cartridge receiving chamber 34 to the backframe opening. As each unexposed frame is withdrawn from the film cartridge 12, the film spool 16 is correspondingly rotated in a film unwinding direction 44, counter-clockwise in FIG. 1, because the filmstrip 18 is incrementally pulled off the film spool.

A winding spindle 46 for rotationally engaging the film spool 16 inside the end cavity 24, without having to be moved far (deep) enough into the end cavity to engage the split rib 28 in the end cavity, is shown in FIGS. 2–16. The winding spindle 46 is rotated in a film rewinding direction 48, clockwise in FIG. 2, via a coaxial motor-driven gear 50, to wind the filmstrip 18 back into the film cartridge 12. The filmstrip 18 is wound back into the film cartridge 12 after all of the available frames on the filmstrip have been exposed at the backframe opening 36. The drive motor and its coupling with the motor-driven gear 50 are not necessary to disclose, because they are well known parts of the camera 10.

Figure 6:
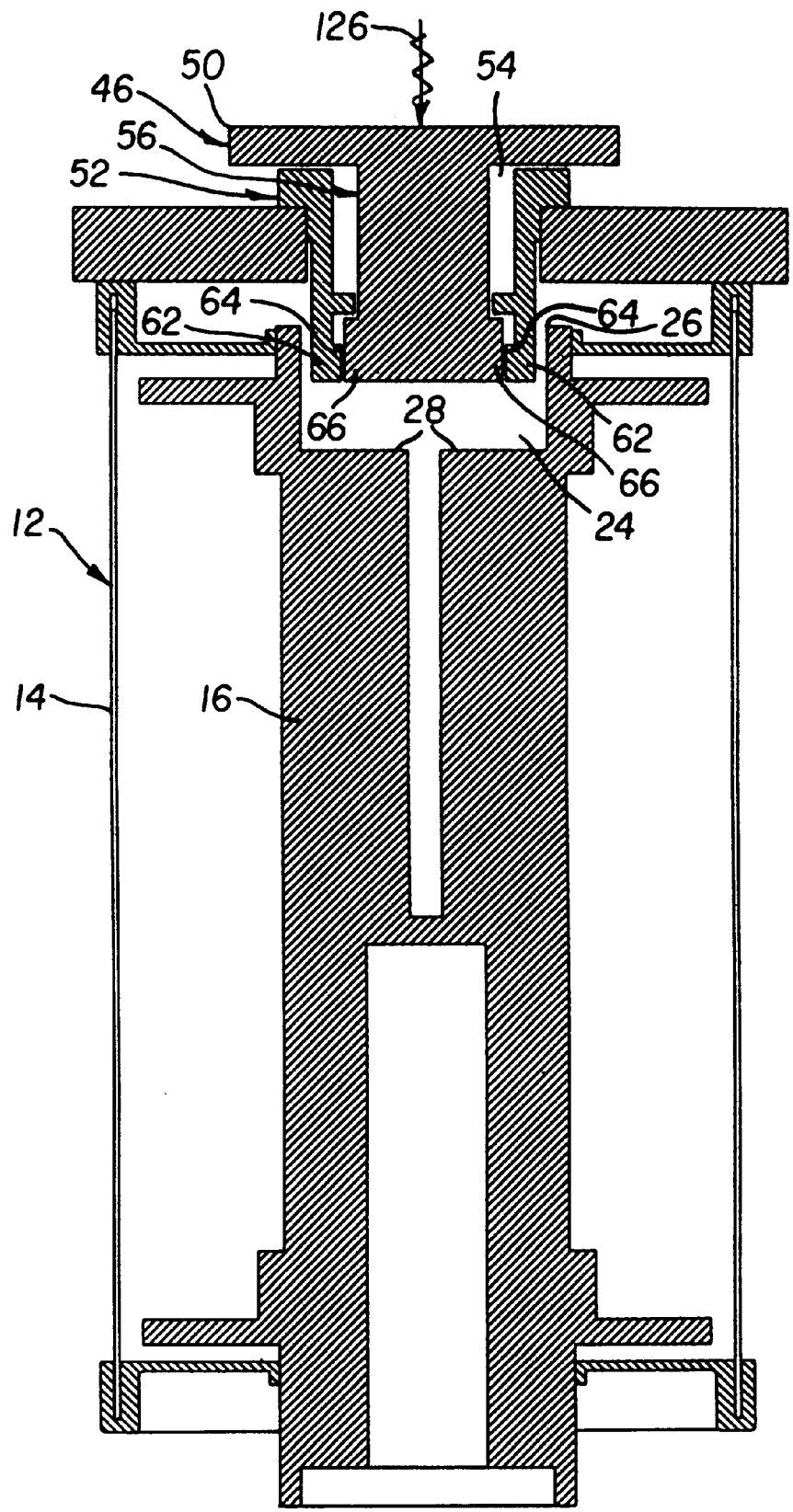
FIG. 6 is a sectional elevation view of the winding spindle, shown when the winding spindle is returned to the end cavity in the film spool in the film cartridge and is not in frictional torque contact with the film spool.
Figure 7:
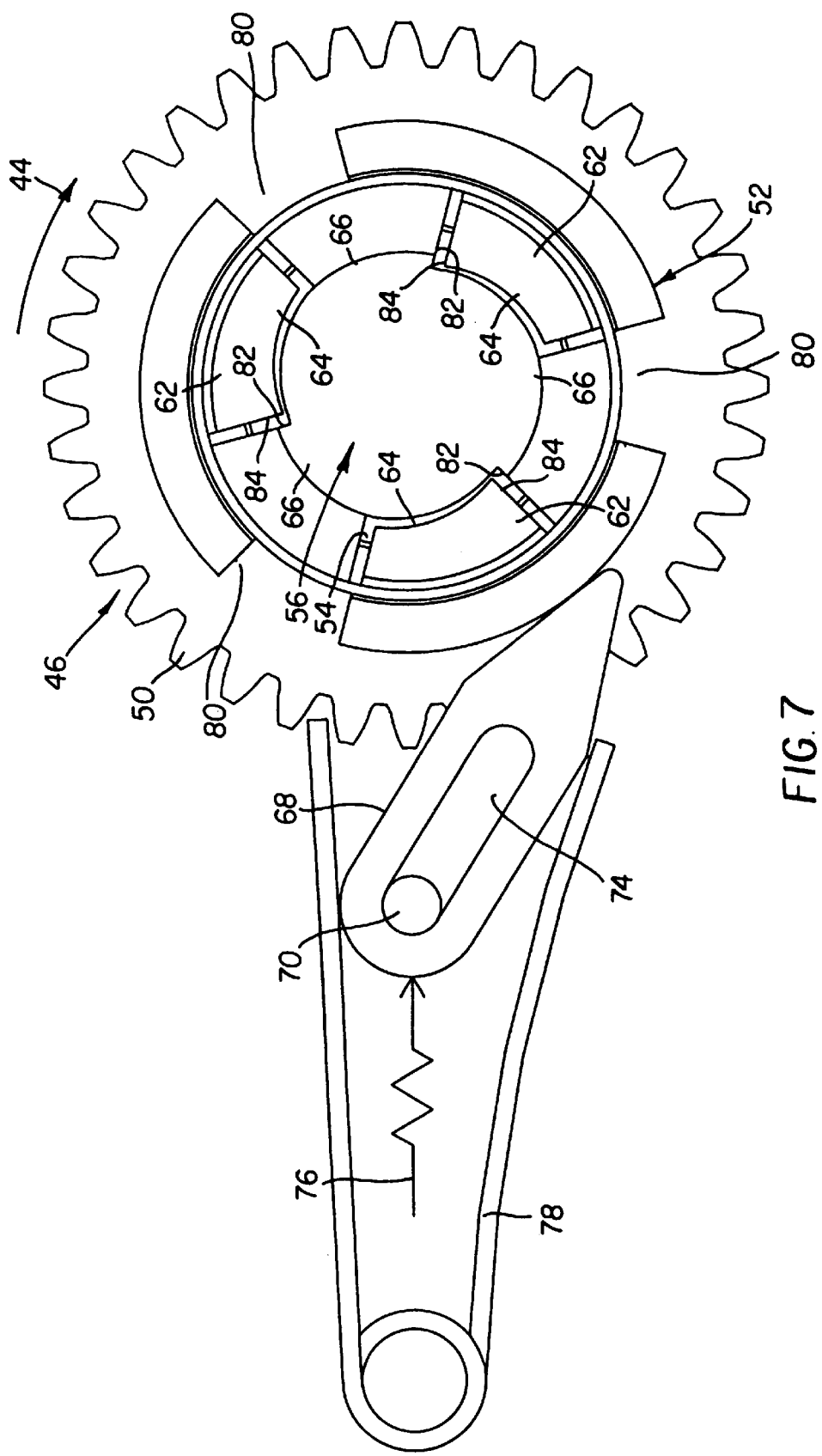
FIG. 7 is a plan view of the winding spindle and a pawl as seen from the bottom of the winding spindle and the pawl.
Figure 8:
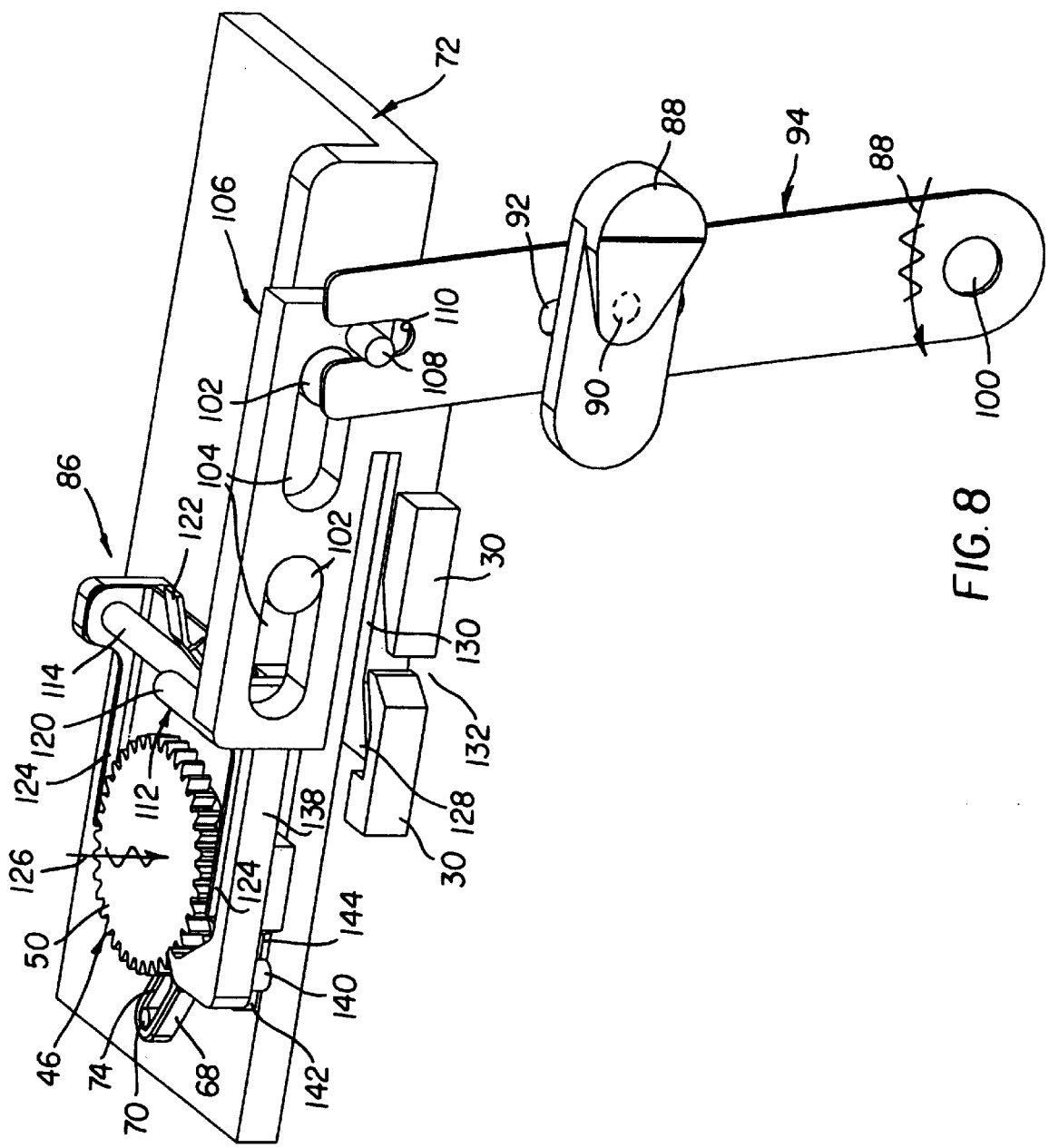
FIG. 8 is an assembled perspective view similar to FIG. 5, shown when unexposed film is unwound from the film spool in the film cartridge.
Figure 9:
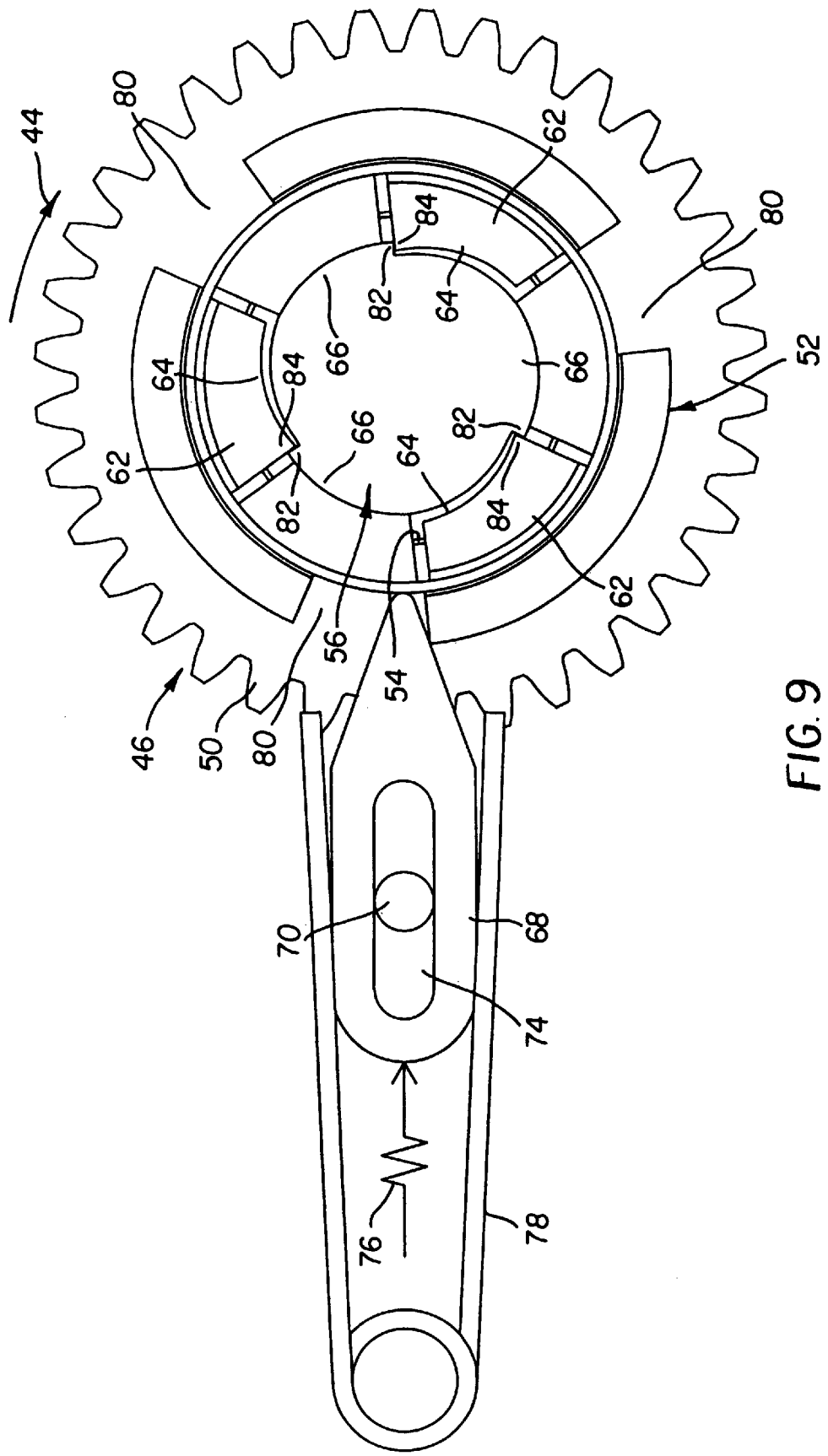
FIGS. 9, 10, 11, 12 and 13 are plan views similar to FIG. 7; showing various interactions of the winding spindle and the pawl.
Figure 10:
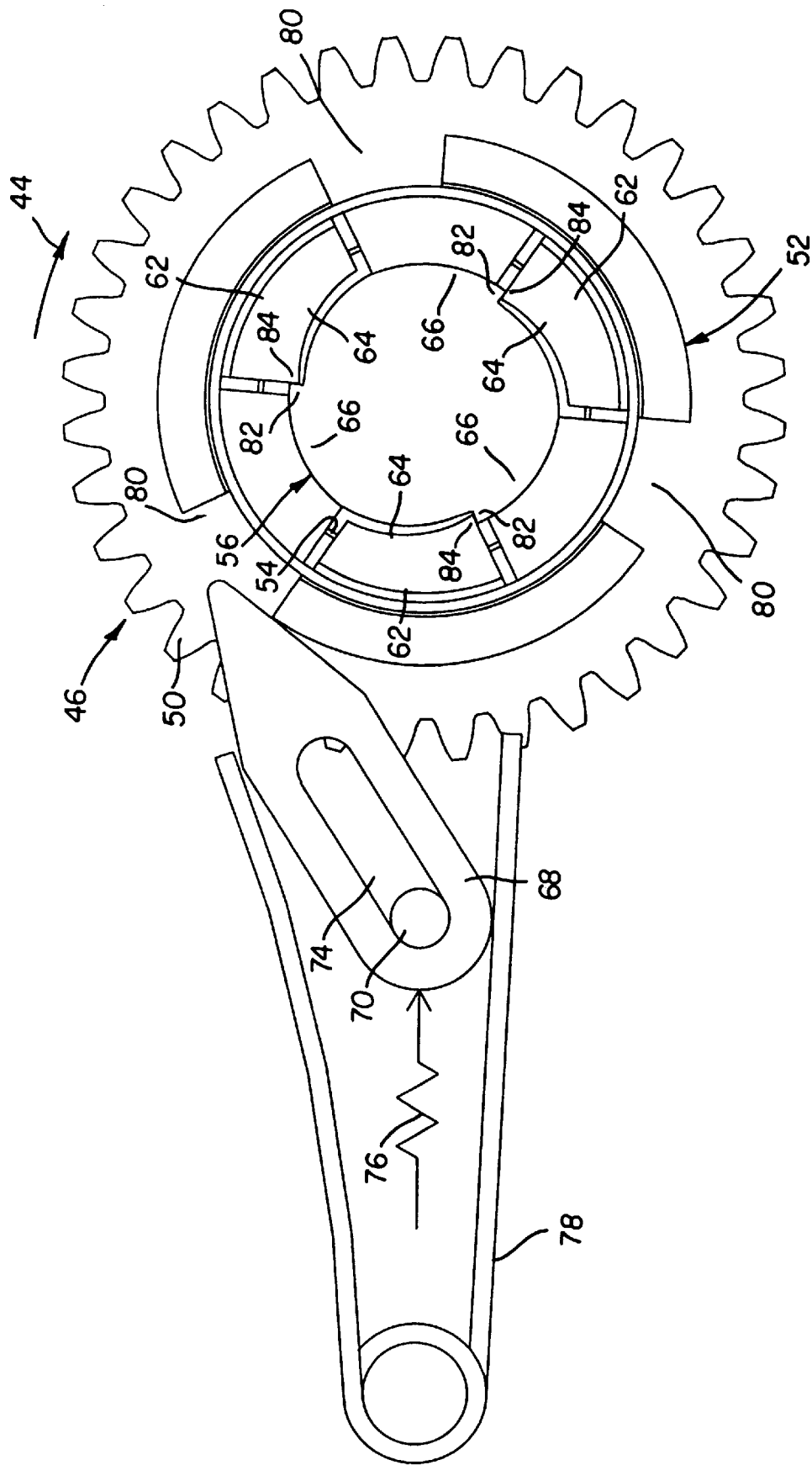

The winding spindle 46 includes a coaxial outer collar 52 having a center hole 54, and a coaxial inner spindle core 56 that is integrally formed with the motor-driven gear 50 and is located in the center hole to be concentric with the outer collar. See FIGS. 2, 4 and 7. The outer collar 52 has a diameter 58 that is less than the diameter 60 of the end cavity 24 to permit the outer collar and the inner spool core 56, in the center hole 54, to be easily received through the ingress opening 26, into the end cavity of the film spool 16 as shown in FIG. 6, and to be easily removed from the end cavity as shown in FIG. 4.

The outer collar 52 has three identical, evenly spaced resilient elastic fingers 62 with respective concave tapered follower protuberances 64 that face radially inward in the center hole 54. See FIGS. 2, 4, 6 and 7. The inner spindle core 56 has three identical rigid, evenly spaced, concave tapered cam protuberances 66 that face radially outward in the center hole 54.

Figure 11:
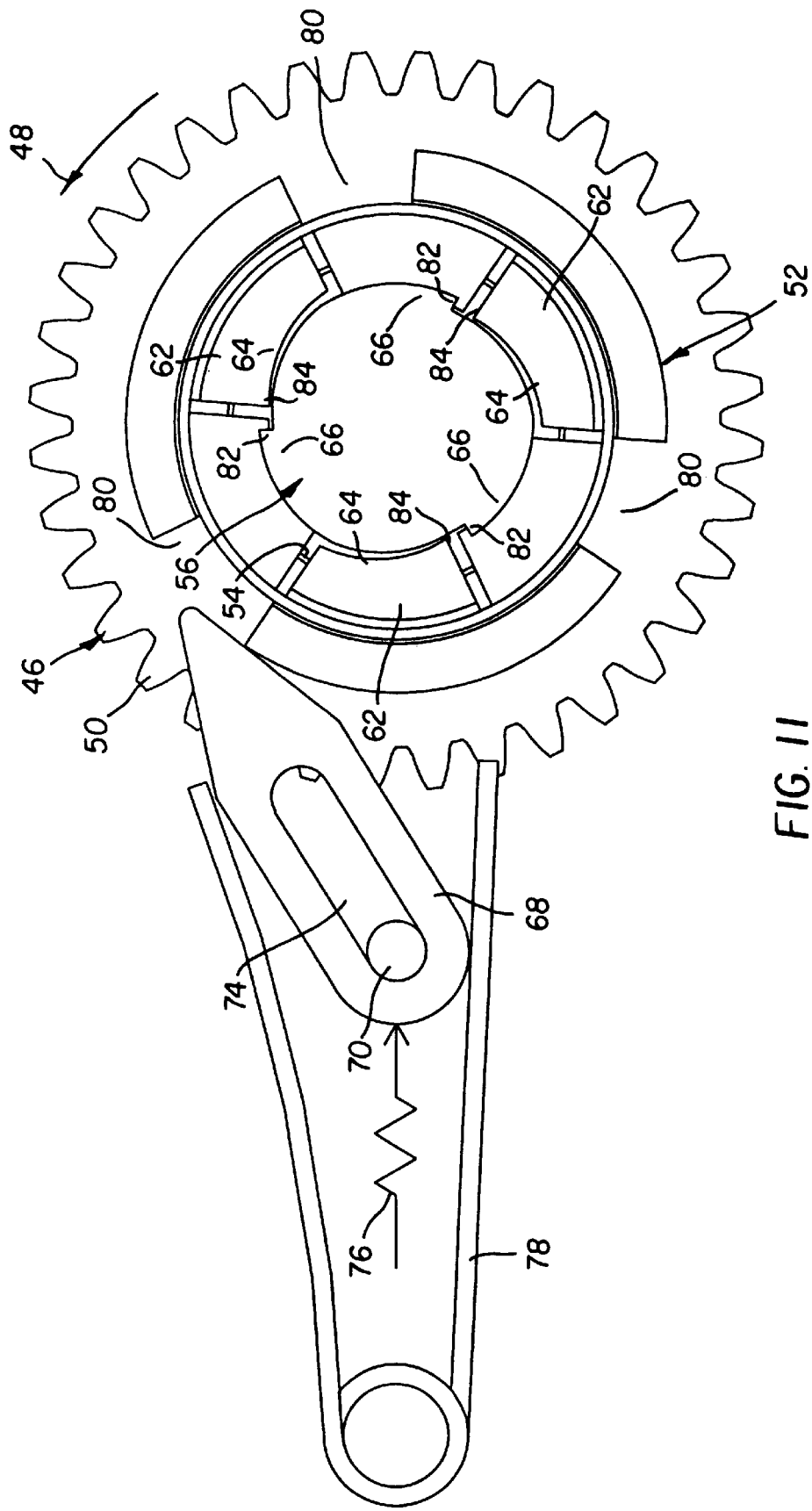
Figure 12:
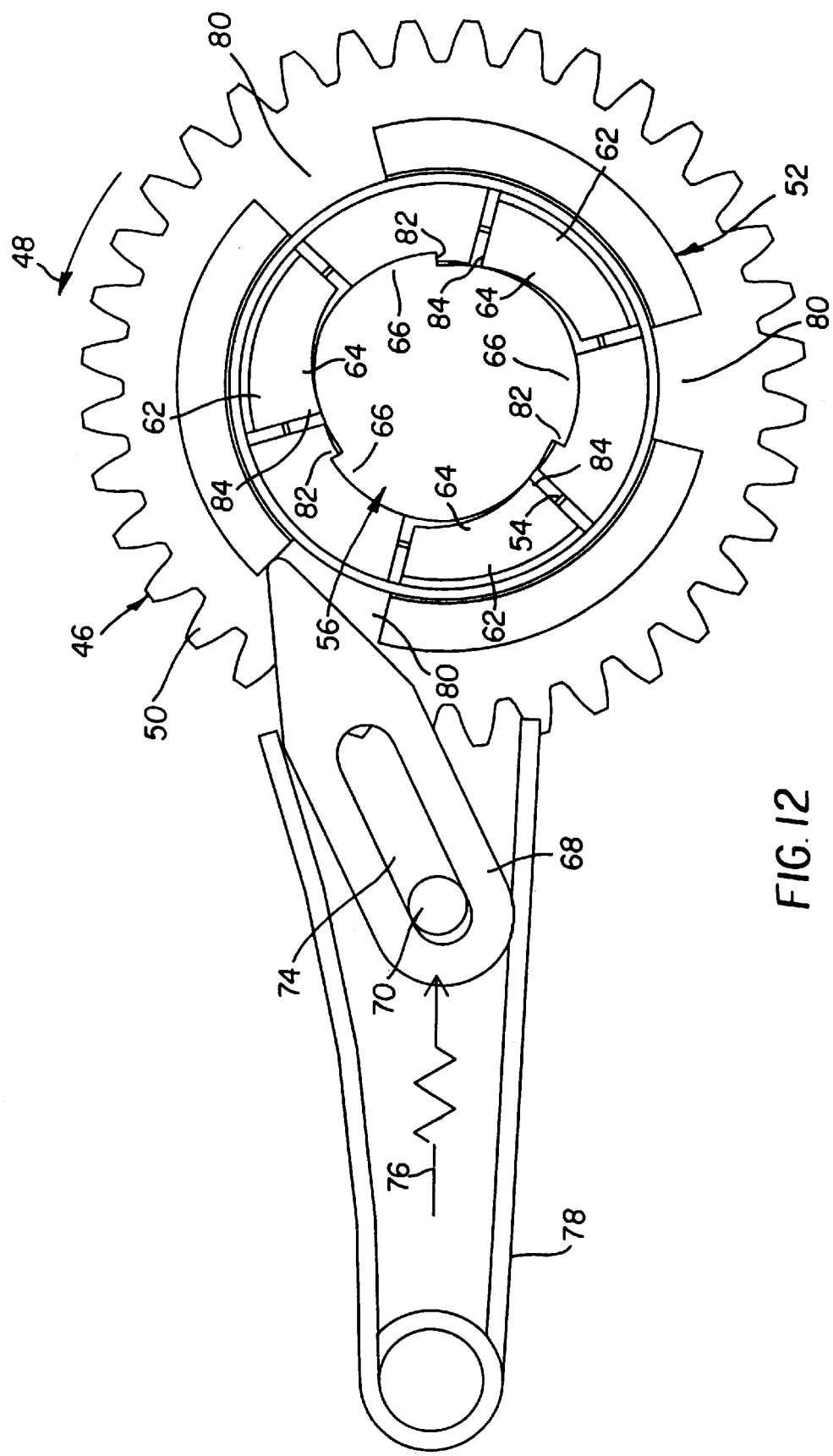
Figure 13:
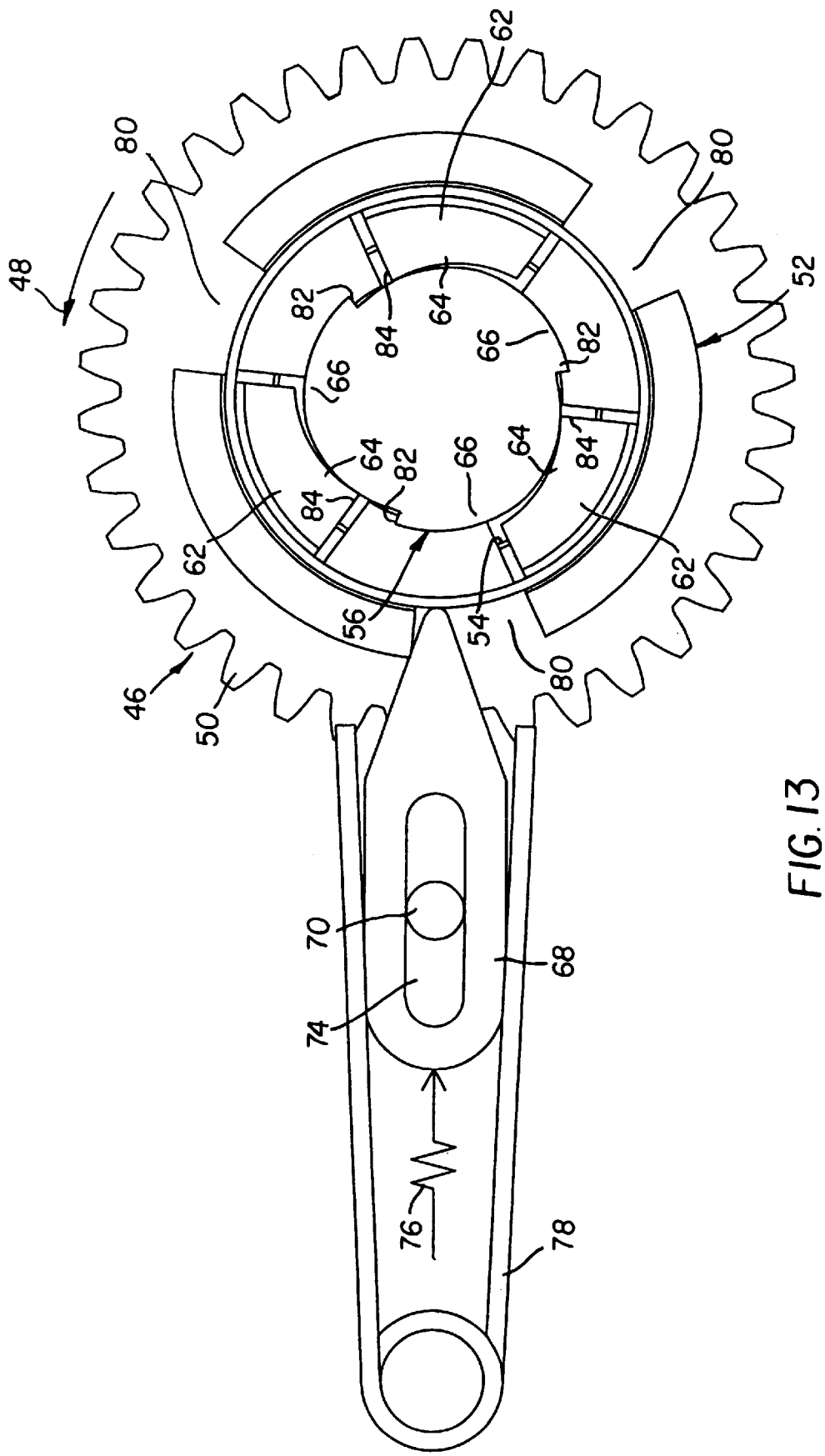
Figure 14:
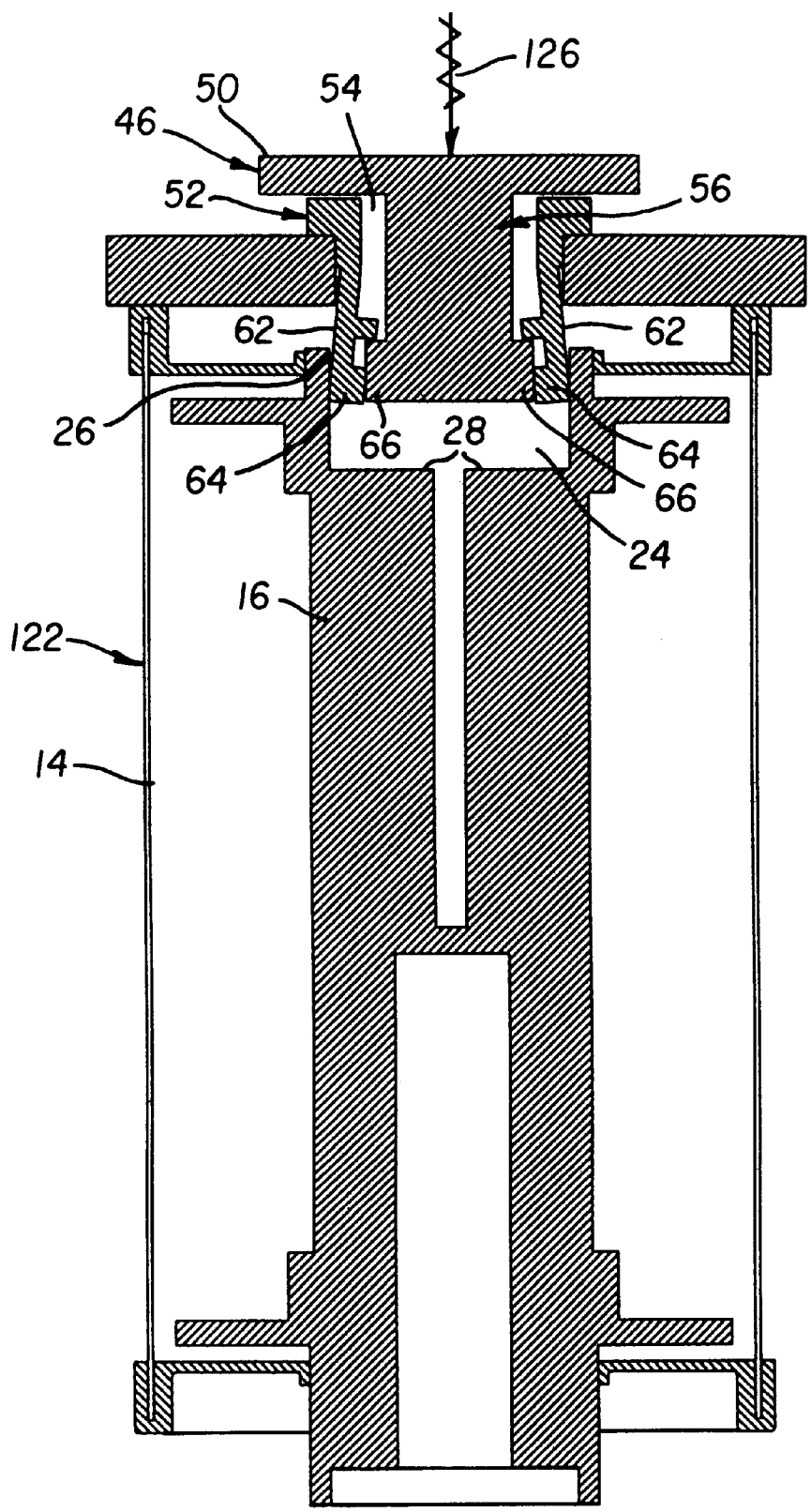
FIG. 14 is sectional elevation view similar to FIG. 6, showing the winding spindle expanded into frictional torque contact with the film spool in the film cartridge.
Figure 15:
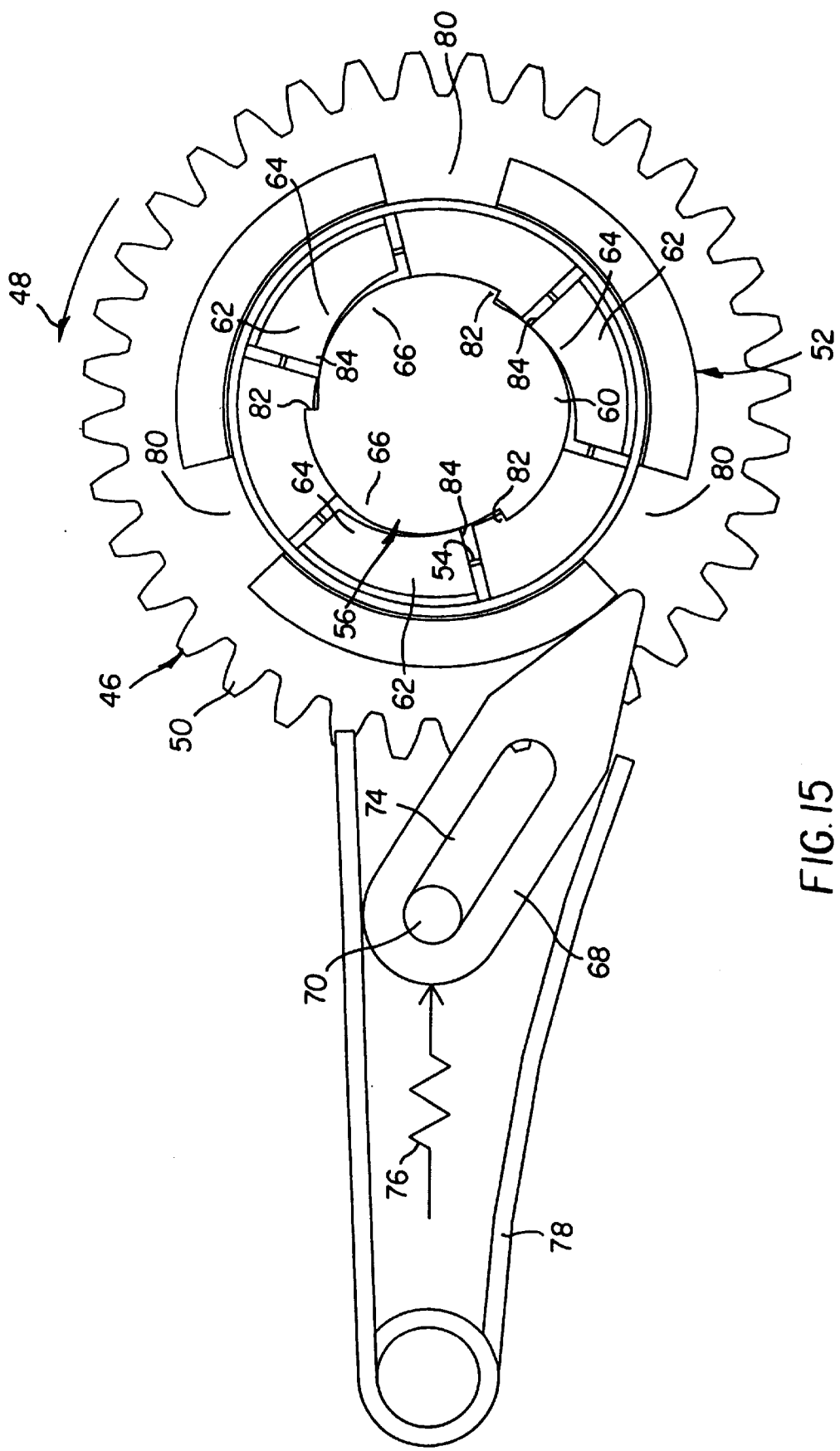
FIG. 15 is a plan view similar to FIGS. 9, 10, 11, 12 and 13, showing continued interaction of the winding spindle and the pawl.

A pawl 68 is supported for combined pivoting and translating movement via a fixed pin 70 that projects from a base plate 72 into an elongate hole 74 in the pawl. A known-type compression spring 76 and a known-type hairpin spring 78 bias the pawl 68 for the pivoting and translating movement. See FIG. 7. The pawl 68 is configured to move temporarily (less than one second) into any one of three identical, evenly spaced, peripheral notches 80 in the outer collar 52, as shown in FIGS. 11 and 12, to briefly slow (retard) rotation of the collar in the film rewinding direction 48 when the inner spindle core 56 is initially rotated in that direction via the motor-driven gear 50. This allows the inner spindle core 56 to be rotated slightly faster than (relative to) the outer collar 52, for the cam protuberances 66 on the spindle core to act on the follower protuberances 64 on the collar to expand or deform the elastic fingers 62 of the collar outwardly at least to the diameter 60 of the end cavity 24 in the film spool 16 as shown in FIGS. 13–15. Thus, the winding spindle 46 makes frictional torque (rotation driving) contact with the film spool 16 to firmly rotate the film spool 16 in the film unwinding direction 48.

FIGS. 11–13 and 15 show movement of the pawl 68 when the inner spool core 56 is rotated in the film rewinding direction 48 via the motor-driven gear 50 in order to expand the elastic fingers 62 of the outer collar 52 into frictional torque contact with the film spool 16. As depicted, engagement of the pawl 68 with the outer collar 52 at any one of the peripheral notches 80 in FIG. 12, pivots the pawl clockwise about the fixed pin 70 from one terminal position shown in FIG. 11, to a midway position shown in FIG. 13, and then to another terminal position shown in FIG. 15. The compression spring 76 and the hairpin spring 78 act to maintain the pawl 68 in the in either one of the terminal positions shown in FIGS. 11 and 15.

On the other hand, when each exposed frame is automatically advanced from the backframe opening 36 to the exposed film take-up chamber and a fresh unexposed frame is automatically advanced from the film cartridge 12 in the cartridge receiving chamber 34 to the backframe opening, after each picture is taken with the camera 10, the film spool 16 is correspondingly rotated in the film unwinding direction 44, because the filmstrip 18 is incrementally pulled off the film spool. Even though the winding spindle 46 is incrementally rotated in the film unwinding direction 44 via the coaxial motor-driven gear 50, it does not rotate the film spool 16. The winding spindle 46, in this instance, is out of fictional torque contact with the film spool 16 as shown in FIG. 6.

When the inner spindle core 56 is initially rotated in the film unwinding direction 44 as shown in FIGS. 7–10, leading edges 82 of the cam protuberances 66 on the spindle core move against respective edges 84 on the follower protuberances 64 on the outer collar 52 to rotate the collar in the same direction. Consequently, the pawl 68 is engaged with the outer collar 52 at any one of the notches 80 in FIG. 9 to pivot the pawl counter-clockwise about the fixed pin 70 from the terminal position shown in FIG. 7 (and FIG. 5), to the midway position shown in FIG. 9, and then to the terminal position shown in FIG. 10 (and FIG. 8). The compression spring 76 and the hairpin spring 78 maintain the pawl 68 in either one of the terminal positions shown in FIGS. 7 and 10.

A spindle removing device 86 manually actuatable to remove the winding spindle 46 from the end cavity 24 in the film spool 16 as depicted in FIG. 4, and to return the winding spindle to the end cavity as shown in FIG. 6, is shown in FIGS. 2, 3, 5, 8 and 16.

A manual slide button 88 has a fixed pin 90 on its underside that projects into a slot 92 in a pivotable lever 94. See FIG. 2. The slide button 88 is translatable within a slot 96 in the fixed back 40 to limit the extent to which the lever 94 is pivoted. See FIG. 1. A return spring 98 biases the lever 94 to pivot counter-clockwise in FIG. 2 about a bearing hole 100 in the lever. A pivot pin (not shown) supports the lever 94 in the bearing hole 100. The base plate 72 has a pair of fixed pins 102 that project into respective slots 104 in a slider 106 to support the slider for translation. The slider 106 has a fixed pin 108 that projects into a slot 110 in the lever 94 to permit pivoting of the lever to translate the slider. A pivotal lifter 112 is supported for pivotal movement via a pin 114 that extends through a pair of aligned holes 116 in the lifter and adjacent holes 118 in the fixed plate 72. The slider 106 has a cam pin 120 that bears against a bent follower reed 122 on the lifter 112 when the slider is translated to the right as in FIGS. 2 and 3 to pivot the lifter 112 clockwise about the pin 114. In turn, a pair of parallel resilient arms 124 on the lifter 112 lift the winding spindle 46 from the end cavity 24 in the film spool 16 as depicted in FIG. 4. Conversely, when the slider 106 is translated to the left as in FIG. 5, the cam pin 120 is separated from the follower reed 122. This allows a return spring 126 to depress the winding spindle 46 into the end cavity 24 in the film spool 16 as depicted in FIG. 6, which pivots the lifter 112 counter-clockwise about the pin 114 beginning at the arms 124.

Figure 2:
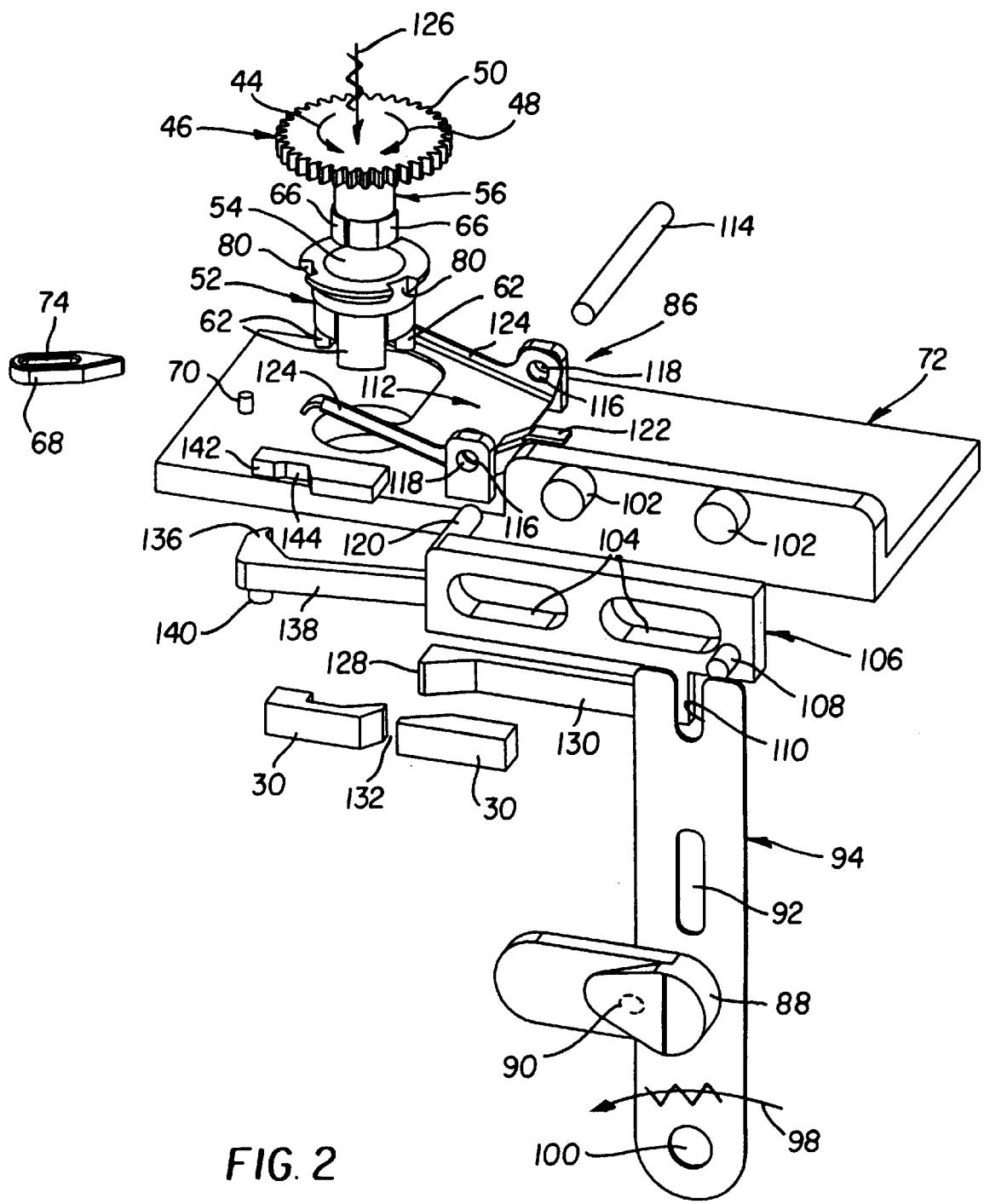
FIG. 2 is an exploded perspective view of the winding spindle, shown when the rear door is open.
Figure 3:
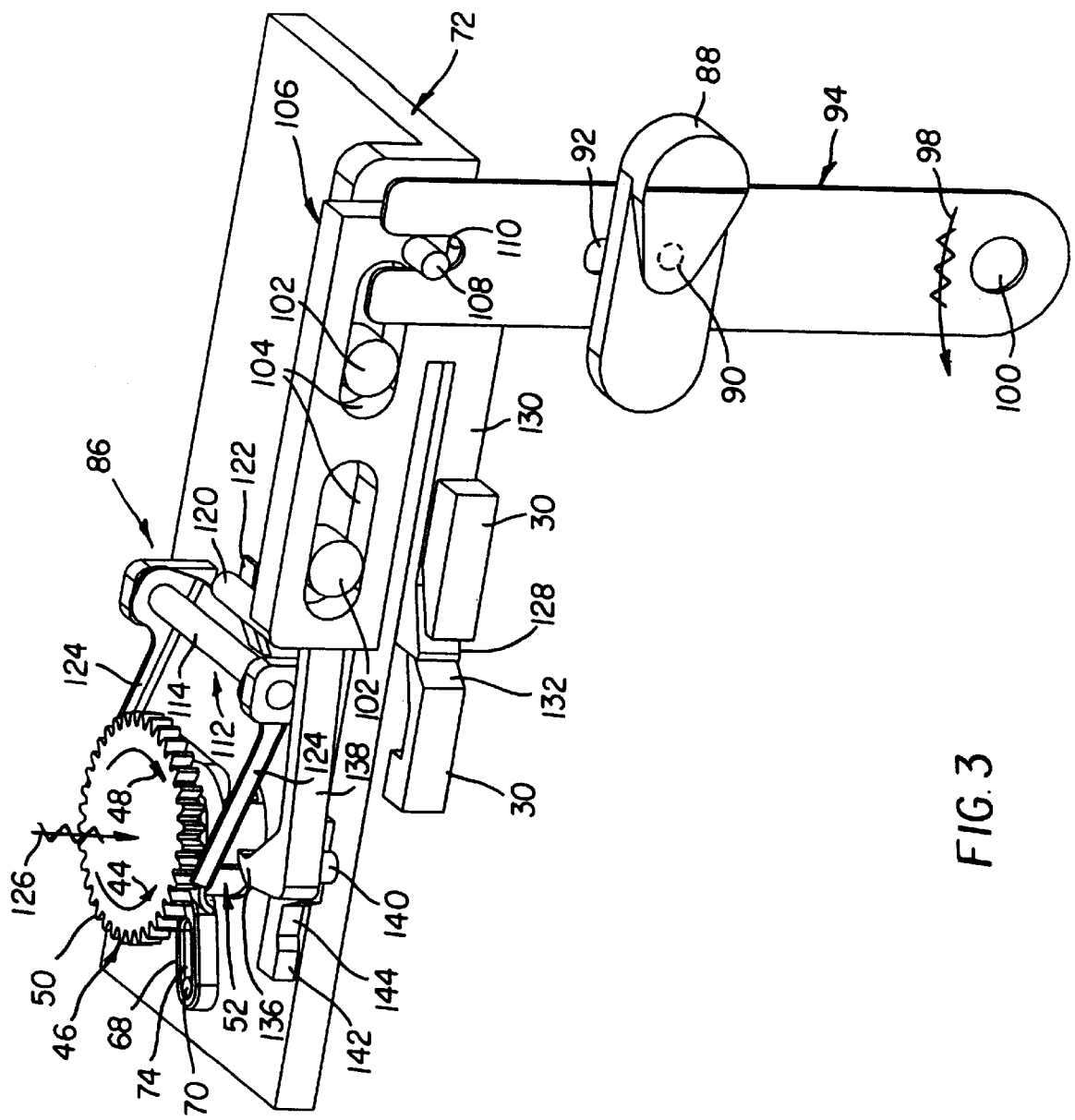
FIG. 3 is an assembled perspective view similar to FIG. 2, shown when the rear door is open.

In FIG. 3, the arms 124 on the lifter 112 have lifted the winding spindle 46 from the end cavity 24 in the film spool 16 as depicted in FIG. 4, and the rear door 38 is open as shown in FIG. 1. A retaining pawl 128 that is integral with a resilient cantilever 130 on the slider 106 is positioned in a notch 132 in the main body part 30 to retain the slider as depicted in FIG. 2.

Figure 5:
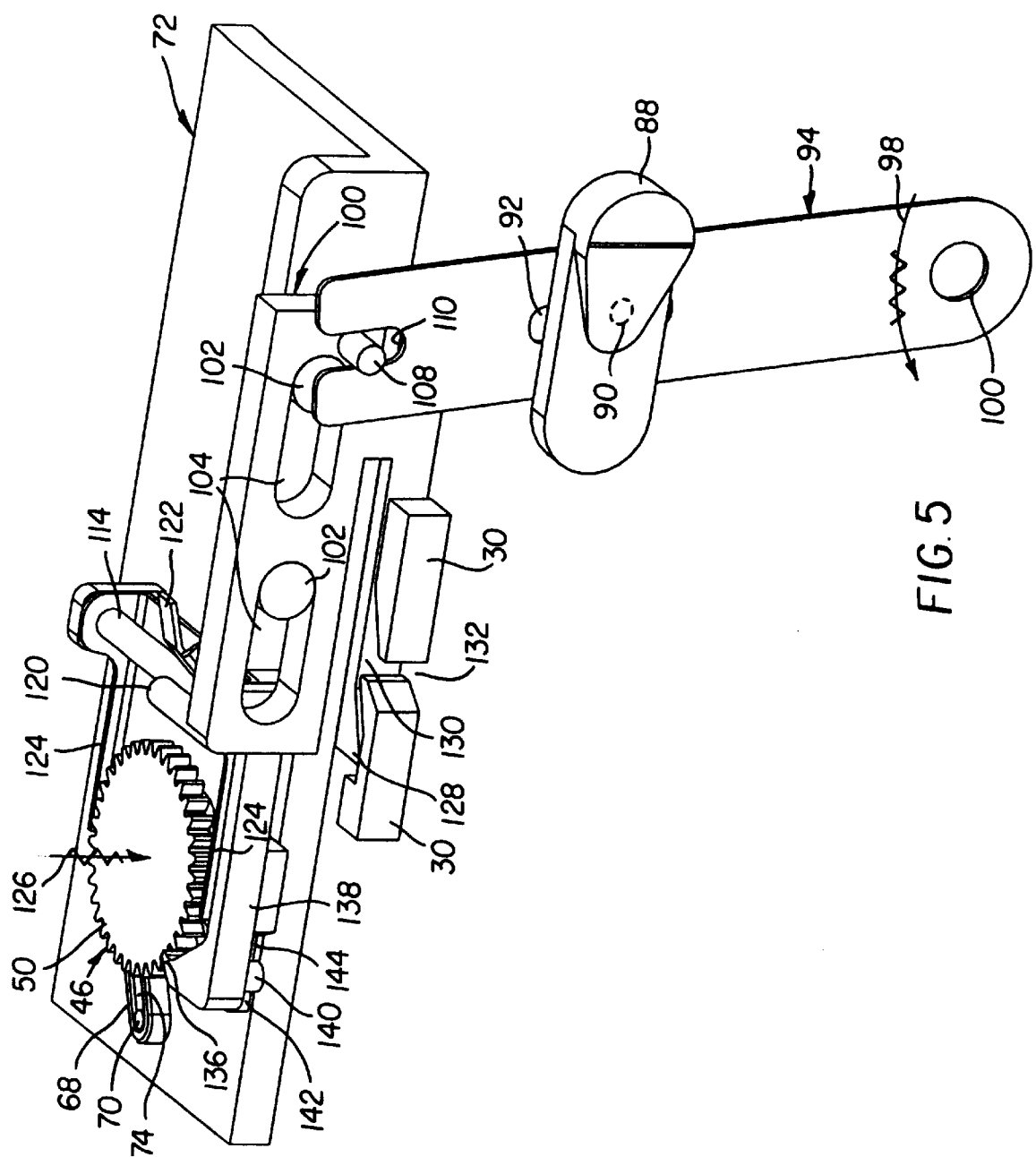
FIG. 5 is an assembled perspective view similar to FIG. 2, shown when the rear door is closed.

In FIG. 5, the rear door 38 is pivoted closed, which swings a release projection 134 on the inside of the door into the notch 132 in the main body part 30 to force the retaining pawl 128 out of the notch. Then, the return spring 98 pivots the lever 94 counter-clockwise to translate the slider automatically to the left as in FIG. 5. The slide button 88 is translated with pivoting of the lever 94 to latch the rear door 38 closed via a known latch (not shown) connected to the slider button.

Figure 16:
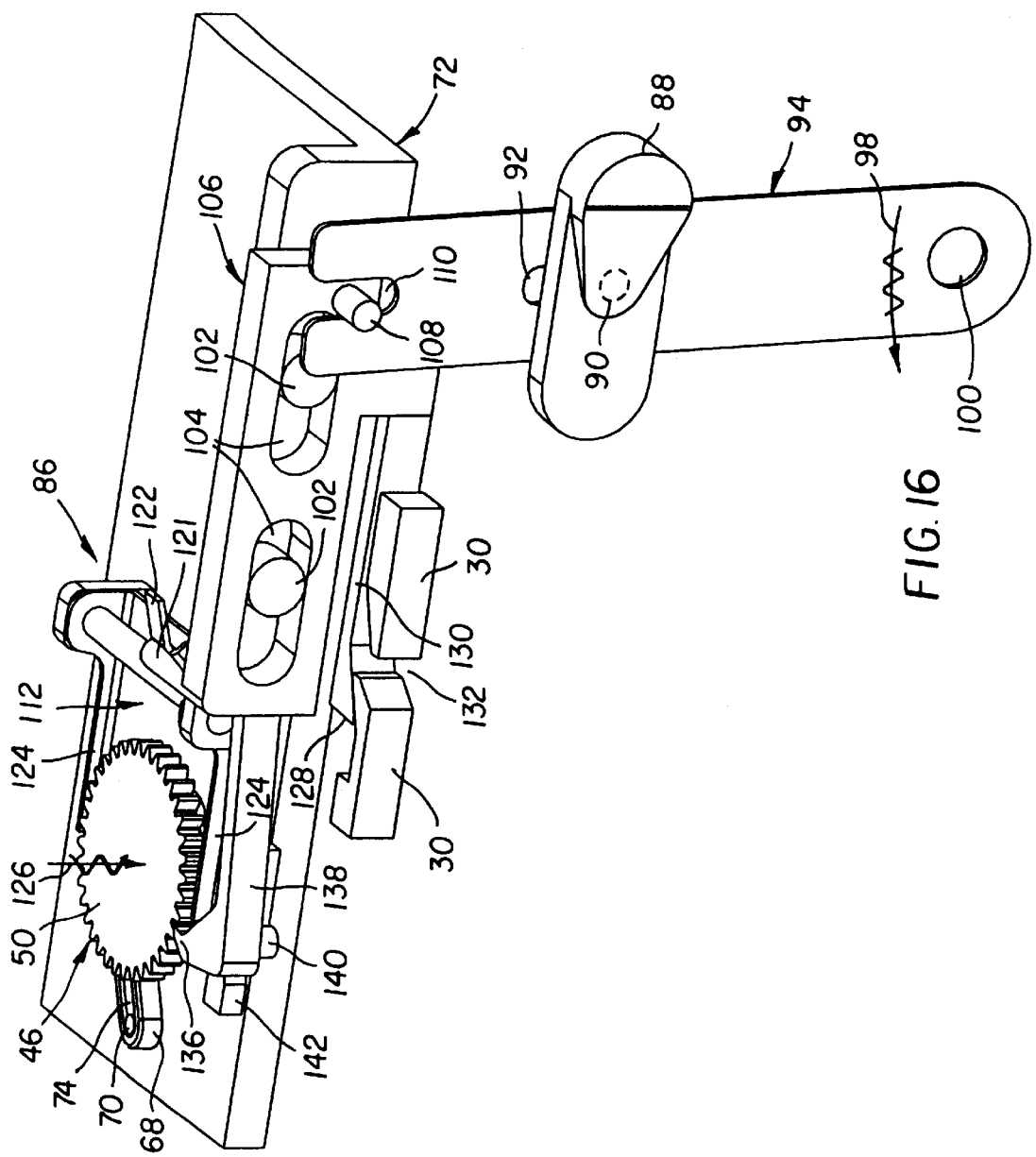
FIG. 16 is an assembled perspective view similar to FIG. 5, show when exposed film is completely wound into the film cartridge and the rear door is re-opened.

In FIG. 16, the slider button 88 is manually translated to the right to unlatch the rear door 38 and to return the cam pin 120 to the follower reed 122 on the lifter 112 in order to pivot the lifter 112 clockwise about the pin 114 as depicted in FIG. 2. In turn, the arms 124 on the lifter 112 lift the winding spindle 46 from the end cavity 24 in the film spool 16 as depicted in FIG. 4. However, before the winding spindle 46 can be lifted, a picker 136 supported on a resilient cantilever 138 on the slider 106 is slightly translated with the slider to the right as in FIG. 16 to engage and slightly rotate the gear 50 in the film unwinding direction 44. This is done to similarly rotate the inner spindle core 56 relative to the outer collar 52 to allow the fingers 62 to of the collar to resiliently retract out of frictional torque contact with the film spool 16 as show in FIG. 6. A protuberance 140 on the bottom of the picker 136 rests against a spacer 142 on the base plate 72 to hold the picker out of engagement with the gear 50, but falls into a notch 144 in the spacer to allow the picker to engage the gear when the picker translated to the right in FIG. 16.

The invention has been described with reference to a preferred embodiment. However, it will be appreciated that variations and modifications can be effected by a person of ordinary skill in the art without departing from the scope of the invention.

PARTS LIST 10. camera
12. film cartridge
14. cartridge shell
16. film spool
18. filmstrip
20. film leader
22. light-trapping slot
24. end cavity
26. ingress opening
28. split rib
30. main body part
32. housing
34. cartridge receiving chamber
36. backframe opening
38. rear door
40. fixed back
42. filmrails
44. film unwinding direction
46. winding spindle
48. film rewinding direction
50. gear
52. outer collar
54. center hole
56. inner spindle core
58. diameter
60. diameter
62. fingers
64. follower protuberances
66. cam protuberances
68. pawl
70. pin
72. base plate
74. hole
76. compression spring
78. hairpin spring
80. notches
82. leading edges
84. respective edges
86. spindle removing device
88. slide button
90. pin
92. slot
94. lever
96. slot
98. return spring
100. bearing hole
102. pins
104. slots
106. slider
108. pin
110. slot
112. lifter
114. pin 116. holes
118. holes
120. cam pin
122. follower reed
124. arms
126. return spring
128. retaining pawl
130. cantilever
132. notch
134. release projection
136. picker
138. cantilever
140. protuberance
142. spacer
144. notch

What is claimed is:

1. A camera comprising a chamber for receiving a rotatable film spool having an accessible end cavity, and a winding spindle for rotationally engaging the film spool inside the end cavity, is characterized in that:

said winding spindle includes a pair of concentric parts one of which is expandable inside the end cavity into frictional torque contact with the film spool and the other concentric part is rotatable inside the end cavity relative to the concentric part that is expandable to expand the concentric part that is expandable into frictional torque contact with the film spool in order to rotate the film spool.

2. A camera as recited in claim 1, wherein said concentric part that is expandable is elastic to permit said concentric part to be expanded and said other concentric part is rigid to be able to expand the concentric part that is expandable.

3. A camera as recited in claim 1, wherein said concentric part that is expandable is an outer part having a center hole, and said other concentric part is an inner part that is rotatable within said center hole to expand said outer part.

4. A camera comprising a chamber for receiving a rotatable film spool having an accessible end cavity, and a winding spindle for rotationally engaging the film spool inside the end cavity, is characterized in that:

said winding spindle includes an expandable part that is expandable inside the end cavity into driving contact with the film spool and a non-expandable part that is movable relative to said expandable part in one direction to expand said expandable part into driving contact with the film spool in order to rotate the film spool and in an opposite direction to allow the expandable part to retract inside the end cavity to discontinue driving contact with the film spool in order to be removed from the end cavity.

5. A camera comprising a chamber for receiving a rotatable film spool having an accessible end cavity, and a winding spindle for rotationally engaging the film spool inside the end cavity, is characterized in that:

said winding spindle includes a pair of concentric parts a first of which is positioned inside the end cavity and elastic to be able to be movable inside the end cavity into driving contact with the film spool and a second of which is movable inside the cavity relative to said first concentric part to move the first concentric part into driving contact with the film spool due to the elasticity of the first concentric part inside the end cavity.

6. A camera as recited in claim 5, wherein said first concentric part is an outer part having a center hole, and said second concentric part is an inner part that is movable within said center hole relative to said outer part.

7. A camera comprising a chamber for receiving a rotatable film spool having an accessible end cavity, and a winding spindle for rotationally engaging the film spool inside the end cavity, is characterized in that:

said winding spindle includes a pair of concentric parts a first of which is an outer part having a center hole and at least partially movable inside the end cavity into driving contact with the film spool and a second of which is an inner part movable within said center hole and inside the end cavity relative to said outer part to at least partially move the outer part into driving contact with the film spool; and said outer part is a collar having resilient portions capable of being deformed outwardly into driving contact with the film spool, and said inner part is a rotatable spindle core having cam portions for deforming said resilient portions outwardly when said spindle core is rotated within said center hole relative to said collar.

8. A camera as recited in claim 7, wherein a pawl is supported to temporarily engage said collar to permit said spindle core to be rotated relative to the collar.

9. A method of rotationally engaging and disengaging a winding spindle and a rotatable film spool, said method comprising the steps of:

expanding the winding spindle inside an end cavity of the film spool at least to the diameter of the end cavity, for the winding spindle to make frictional torque contact with the film spool in order to rotate the film spool; and retracting the winding spindle inside the end cavity of the film spool to less than the diameter of the end cavity, for the winding spindle to discontinue frictional torque contact with the film spool in order to permit removal of the winding spindle from the end cavity.

10. A method of rotationally engaging and disengaging a winding spindle and a rotatable film spool, said method comprising the steps of:

moving a rigid part of the winding spindle in one direction relative to a resilient elastic part of the winding spindle to expand the resilient elastic part inside an end cavity of the film spool at least to the diameter of the end cavity, for the resilient elastic part to make frictional torque contact with the film spool in order to rotate the film spool; and moving the rigid part in an opposite direction relative to the resilient elastic part to allow the resilient elastic part to retract inside the end cavity of the film spool to less than the diameter of the end cavity, for the resilient elastic part to discontinue frictional torque contact with the film spool.

* * * * *